United States Patent [11] 3,607,907

[72] Inventors Herbert Eck;
 Hellmuth Spes, both of Burghausen-Upper Bavaria, Germany
[21] Appl. No. 676,048
[22] Filed Oct. 18, 1967
[45] Patented Sept. 21, 1971
[73] Assignee Wacker-Chemie G.m.b.H.
 Munich, Germany
[32] Priority Oct. 26, 1966
[33] Germany
[31] W 42670

[54] PROCESS FOR MAKING COPOLYESTERS CONTAINING ETHER GROUPS
 5 Claims, No Drawings
[52] U.S. Cl. ............................................. 260/473 G,
 260/31.4 R, 260/481 R, 260/484 A
[51] Int. Cl. ........................................... C07c 69/76,
 C08g 51/42
[50] Field of Search ........................................ 260/473, 484

[56] References Cited
 OTHER REFERENCES
 Sorm et al., " Chem. Abstr.," 49: 175 (1955)
 Hurd et al. JACS 83: 236 (1961)

*Primary Examiner*—Lewis Gotts
*Assistant Examiner*—R. S. Weissberg
*Attorney*—Donald Malcolm

ABSTRACT: This invention relates to the manufacture of copolyesters containing ether groups, and it has for its object to provide a simple and efficient process for this purpose.

PROCESS FOR MAKING COPOLYESTERS CONTAINING ETHER GROUPS

BACKGROUND OF THE INVENTION

It is known that ketenes react with acetals to form β-alkoxycarboxylic acid esters and with semicyclic acetals, e.g. with 2-methoxytetrahydropyran to form 2-tetrahydropyran acetate and 3-methoxy-7-hydroxyheptenoate (C.D. Hurd and R.D. Kimbrough, J. Am. Chem. Soc., 1961; page 237; No. 83).

SUMMARY OF THE INVENTION

We have discovered a process for making ether group containing copolyesters of the general formula

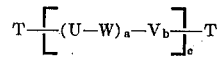

The process is characterized by the fact that we react polyacetals having the structural unit $$-O-A-O-CHR'-$$

alone or in admixture with cyclic acetals of the general formula

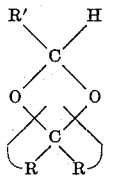

with ketenes of the general structure $(R'')_2 C = C = O$ in the presence of an acid catalyst at temperatures between $-80°$ and $160°$ C, if necessary using a solvent. In the above formulas:

T = —OH, —COOH, —O—CO—CR''$_2$    —CO—O—CO—CR''$_2$

U = —O—A—O—
V = —O—A—O—CHR'—CR''$_2$—CO—
W = —CO—CR''$_2$ —CHR'—O—A—O—CHR'—CR''$_2$ —CO—

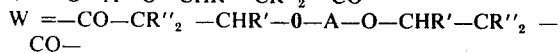

or a substituted or unsubstituted, monocyclic or polycyclic, aromatic, bivalent residue like for instance

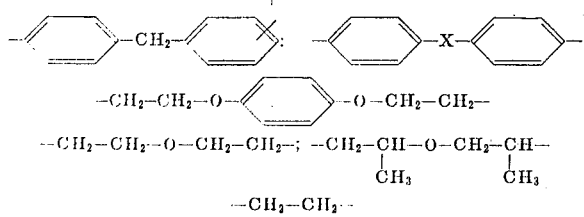

X = O or S,
a = 0 – 25
b = 0 – 50 with the proviso that a and b cannot be zero at the same time
c = 1 – 10,
R = H, halogen, saturated or unsaturated, branched or unbranched, perhaps substituted alkyl residues, where in the main chain there can also be a C-C double bond, substituted or unsubstituted, mono- or divalent-alicyclic, aromatic or heterocyclic residues, where in the case of equality of all residues R must not be larger than $C_2H_5$
R' = H, saturated or unsaturated, branched or unbranched, perhaps substituted aliphatic residue, substituted or unsubstituted alicyclic, aromatic or heterocyclic residue, where R and R' must not react alkaline.
R'' = H or alkyl

DESCRIPTION OF THE PREFERRED EMBODIMENTS

The process can be carried out continuously or discontinuously. Suitable for acid catalysts are mineral acids, e.g. sulfuric acid, phosphoric acid, difluorophosphoric acid, hexafluorophosphoric acid and/or Friedel-Krafts catalysts, e.g. boron trifluoride etherate, aluminum chloride, zinc chloride, iron (III) chloride.

For the catalyst concentration, a quantity of 0.05 percent, referred to the acetal used, is adequate. The upper limit is guided by considerations of economy and generally does not exceed 7 percent. Preferably a catalyst concentration of 0.5 to 5 percent is used.

As solvents all inert solvents are suitable, like ether, chlorinated hydrocarbons, e.g. methylene chloride, trichlorethylene, hydrocarbons, e.g. benzene, toluene or cyclohexane, carboxylic acid esters, e.g. acetic acid ethyl ester and/or silicon tetraalkylates or acetic acid anhydride.

When using mixtures with bicyclic acetals each with one acetal group per ring and/or with branched polyacetals, correspondingly branched ether group-containing copolyesters are formed. It was definitely not to be expected that the described acetals and acetal mixtures would react with ketene in such a manner, because these, as is known, yield different products, depending on the catalyst and the reaction conditions.

Moreover, it was surprising that each acetal group of a polymer molecule reacts with ketene and that from an impure polymer starting substance it was possible to obtain an analysis-pure product.

The polyesters formed by our process are suitable, among other uses, for use as softeners for plastics and for the manufacture of polyester resins.

EXAMPLE 1

Fifty-one g. of 1, 3-dioxepane were polymerized by adding 1.5 ml. boron trifluoride etherate at room temperature and dissolved in 150 ml. ether. Forty-five g. ketene were piped through this solution at 20°–40° C. The solution took up 22 g. ketene, and the reaction mixture turned red. After neutralizing with sodium acetate it was washed out with water and at 160°–170° C. it was freed of the low, boiling components. The remainder was the polyester that was formed with a 90 percent yield: (a viscous yellow oil molecular weight 1,090) Hydroxyl number: 14.6 ; acid number: 18.5

| Analysis: | Actual (%) | Computed (%) |
|---|---|---|
| C | 57.81 | 58.33 |
| H | 8.80 | 8.33 |

EXAMPLE 2

During the fractionating of 5, 5-dimethyl-1,3-dioxan, 40 percent of a no longer distillable, polymerized, waxlike acetal remained in the still.

| Analysis: | Actual (%) | Computed (%) |
|---|---|---|
| C | 60.10 | 62.01 |
| H | 10.51 | 10.34 |

Without further purification, 50 g. of this substance was dissolved in 150 ml. dry methylene chloride. 20 g. ketene was piped through this solution at $-20°$ C. 0.5 ml. hexafluorophosphoric acid was used as a catalyst. The processing was done in the same manner as in example 1. The yield (a viscous yellow oil, molecular weight about 1,350) 83 percent.

| Analysis | Actual (%) | Computed (%) |
|---|---|---|
| C | 60.56 | 60.76 |
| H | 9.05 | 8.86 |

EXAMPLE 3

The same as when making 5,5-dimethyl-1,3-dioxan, a considerable quantity (about 30 percent) of a no longer distillable product likewise remained in the still during the processing of 2-phenyl-5-5-dimethyl-13-dioxan. 50 g. of this residue was dissolved together with 4.5 ml. boron trifluoride dietherate as catalyst, in 150 ml. dry benzene, and 12 g. ketene was piped through this solution at 5° C. The processing was done in the same manner as in example 1. The yield a yellowish resin, brittle at room temperature, molecular weight about 1,450 was 85 percent.

| Analysis: | Actual (%) | Computed (%) |
|---|---|---|
| C | 71.55 | 71.79 |
| H | 8.00 | 7.69 |

EXAMPLE 4

A solution of 970 g. of polymerized 1,3-dioxepane and 2 ml. boron trifluoride etherate in 1460 ml. methylene chloride were pumped into a reactor, into which molar quantities of ketene were piped at the same time, with an input speed of 150 ml. per hour. This corresponded to a staying period of about 80 minutes. The reaction temperature was kept at 27°–32° C. by cooling. The reaction product was freed from the catalyst by means of an ion exchanger and was obtained after withdrawal of the solvent and of the low molecular components at 120° C. in a vacuum in the form of a light, orange colored viscous oil. This copolyether ester (a viscous, orange-colored oil, molecular weight about 1,210) corresponded in its physical properties to what is described in example 1.

EXAMPLE 5

Through a solution of 25 g. of 5,5-dimethyl-1,3-dioxan and 25 g. of the polyacetals made from benzaldehyde and diethylene glycol in 150 ml. methylene chloride, 30 g. ketene was piped at 0° C. in the presence of 0.5 g. hexafluorophosphoric acid over a period of 1 hour. The reaction solution was neutralized with sodium acetate, washed with water and freed of the low boiling components at 120° C. and 11 mm. Hg. Yield: 90 percent of theory. Molecular weight: 620

| Analysis: | Actual (%) | Computed (%) |
|---|---|---|
| C | 62.75 | 63.28 |
| H | 7.82 | 7.87 |

EXAMPLE 6

Thirty g. ketene were piped at 0° C. over a period of 1 hour into a solution of 10 g. of the polyacetal made from benzaldehyde and diethylene glycol, 40 g. 4-methyl-1,3-dioxane and 0.5 g. hexafluorophosphoric acid in 150 ml. methylene chloride. The processing was done in the same manner as in example 5. Yield: 95 percent of theory.

| Analysis: | Actual (%) | Computed (%) |
|---|---|---|
| C | 60.09 | 59.69 |
| H | 8.05 | 8.06 |

The invention claimed is:

1. Process for making copolyesters containing ether groups, and of the general formula

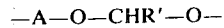

which comprises reacting polyacetals having the structural unit $$-A-O-CHR'-O-$$

alone or in admixture with cyclic acetals of the general formula

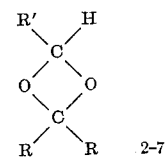

with ketene in the presence of a catalyst selected from the group consisting of mineral acids and Friedel-Crafts catalysts at temperatures between −80° and 160° C. in which formulas $T = -OH, -COOH, -O-CO-CH_2, -CO-O-CO-CH_2$
$U = -O-A-O-$
$V = -O-A-O-CH_2-CO-$
$W = -CO-CH_{CHR'O-A-CHR'-CH2}CO-2$

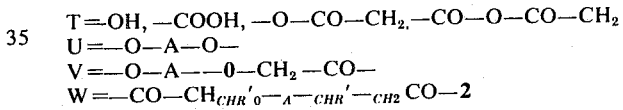

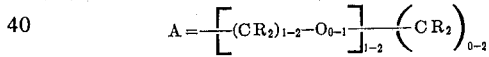

$a = 0-25$
$b = 0-50$ with the proviso that a and b cannot be zero at the same time,
$c = 1-10$
$R$ = alkyl residues, H
$R'$ = H, phenyl.

2. Process according to claim 1, in which the catalyst is a fluorophosphoric acid.

3. Process according to claim 1, characterized by the fact that the catalyst is used in quantities of 0.05 percent to 7 percent, referred to the starting substance.

4. Process according to claim 1, characterized by the fact that the reaction is performed in a solvent selected from the group consisting of hydrocarbons, chlorinated hydrocarbons, carboxylic acid alkyl esters and silicon tetraalkylates.

5. Process for making copolyesters containing ether groups which comprises reacting polyacetals, alone or in admixture with cyclic acetals, with ketene in the presence of an acid catalyst selected from the group consisting of mineral acids and Friedel-Craft catalysts, at a temperature between −80° and 160° C.